(12) United States Patent
Harris et al.

(10) Patent No.: US 10,407,004 B2
(45) Date of Patent: Sep. 10, 2019

(54) SOLID STATE SWITCH FOR VEHICLE ENERGY-STORAGE SYSTEMS

(71) Applicant: Faraday&Future Inc., Gardena, CA (US)

(72) Inventors: W. Porter Harris, Los Angeles, CA (US); Nicholas John Sampson, Rancho Palos Verdes, CA (US)

(73) Assignee: Faraday & Future Inc., Gardena, CA (US)

( * ) Notice: Subject to any disclaimer, the term of this patent is extended or adjusted under 35 U.S.C. 154(b) by 524 days.

(21) Appl. No.: 14/864,815

(22) Filed: Sep. 24, 2015

(65) Prior Publication Data

US 2017/0001584 A1 Jan. 5, 2017

Related U.S. Application Data

(60) Provisional application No. 62/186,977, filed on Jun. 30, 2015.

(51) Int. Cl.
| | |
|---|---|
| *B60R 16/033* | (2006.01) |
| *H01M 2/20* | (2006.01) |
| *H01M 10/42* | (2006.01) |
| *B60R 16/04* | (2006.01) |
| *H02J 7/00* | (2006.01) |
| *B60L 58/21* | (2019.01) |

(Continued)

(52) U.S. Cl.
CPC ............ *B60R 16/033* (2013.01); *B60L 50/64* (2019.02); *B60L 58/21* (2019.02); *B60R 16/04* (2013.01); *H01M 2/206* (2013.01); *H01M 10/425* (2013.01); *H01M 10/4207* (2013.01); *H02J 7/0042* (2013.01); *H01M 10/0525* (2013.01); *H01M 16/00* (2013.01); *H01M 2010/4271* (2013.01); *H01M 2220/20* (2013.01); *Y02E 60/122* (2013.01); *Y02P 70/54* (2015.11)

(58) Field of Classification Search
CPC .................................................... B60R 16/033
See application file for complete search history.

(56) References Cited

U.S. PATENT DOCUMENTS 5,879,833 A 3/1999 Yoshii et al.
8,057,928 B2 11/2011 Kohn et al.
(Continued)

OTHER PUBLICATIONS

Non-Final Office Action, dated Dec. 31, 2015, U.S. Appl. No. 14/841,617, filed Aug. 31, 2015.

*Primary Examiner* — Daniel J Cavallari
(74) *Attorney, Agent, or Firm* — Knobbe Martens Olson & Bear LLP

(57) ABSTRACT

Provided are battery coupling systems. The system may comprise a first terminal electrically coupled to a vehicle electrical system; and a first contactor electrically coupled to a first battery connection of a battery and the first terminal, the first contactor comprising a first solid state switch for selectively coupling and decoupling the first battery connection to and from the first terminal, using a first control signal. The system may also comprise a second terminal electrically coupled to the vehicle electrical system; and a second contactor electrically coupled to a second battery connection of the battery and the second terminal, the second contactor comprising a second solid state switch for selectively coupling and decoupling the second battery connection to and from the second terminal, using a second control signal.

5 Claims, 9 Drawing Sheets

(51) Int. Cl.
*B60L 50/64* (2019.01)
*H01M 10/0525* (2010.01)
*H01M 16/00* (2006.01)

(56) References Cited

U.S. PATENT DOCUMENTS

| | | |
|---|---|---|
| 2001/0046624 A1 | 11/2001 | Goto et al. |
| 2008/0138698 A1 | 6/2008 | Ogami et al. |
| 2009/0023059 A1 | 1/2009 | Kinoshita et al. |
| 2010/0047682 A1 | 2/2010 | Houchin-Miller et al. |
| 2010/0170735 A1* | 7/2010 | Nakamura ............... B60K 1/04 180/68.5 |
| 2013/0171480 A1* | 7/2013 | Englert ................ B60L 3/0046 429/50 |
| 2016/0090054 A1* | 3/2016 | Powell ................ B60H 1/3232 307/9.1 |

\* cited by examiner

SOLID STATE SWITCH FOR VEHICLE ENERGY-STORAGE SYSTEMS

CROSS-REFERENCE TO RELATED APPLICATIONS

This application claims the benefit of U.S. Provisional Application No. 62/186,977 filed on Jun. 30, 2015. This application is related to U.S. patent application Ser. No. 14/841,617 filed on Aug. 31, 2015. The subject matter of the aforementioned applications is incorporated herein by reference for all purposes.

FIELD

The present application relates generally to vehicles, and more specifically to selectively coupling and decoupling vehicle energy-storage systems.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. Since energy-storage systems have high energy densities, energy-storage systems should be electrically coupled to other vehicles systems selectively.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present disclosure may be directed to battery coupling systems. The system can comprise a first terminal electrically coupled to a vehicle electrical system; and a first contactor electrically coupled to a first battery connection of a battery and the first terminal, the first contactor comprising a first solid state switch for selectively coupling and decoupling the first battery connection to and from the first terminal, using a first control signal. The system can also comprise a second terminal electrically coupled to the vehicle electrical system; and a second contactor electrically coupled to a second battery connection of the battery and the second terminal, the second contactor comprising a second solid state switch for selectively coupling and decoupling the second battery connection to and from the second terminal, using a second control signal.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
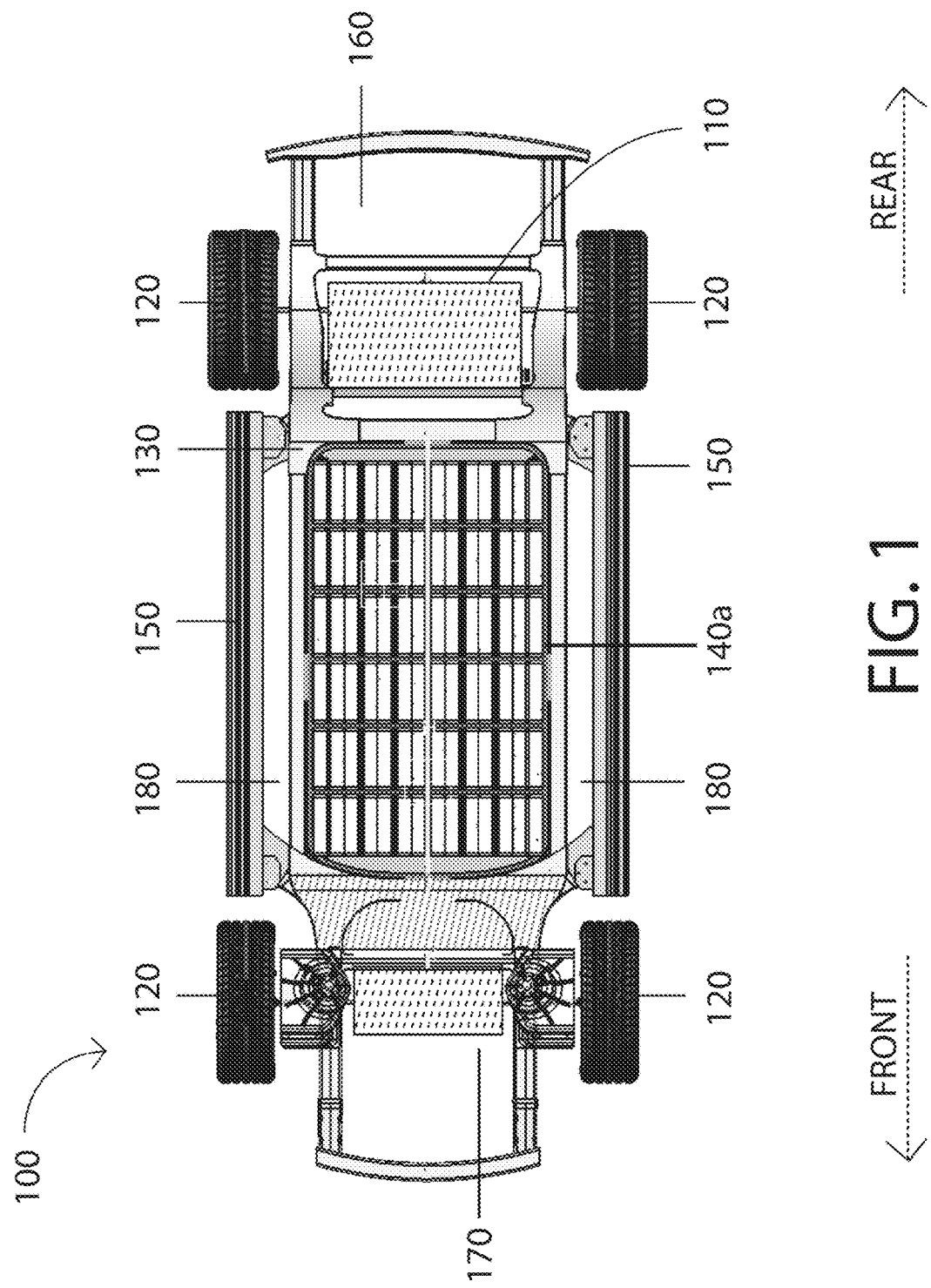
FIG. 1 illustrates an example environment in which an energy-storage system can be used.

While this disclosure is susceptible of embodiment in many different forms, there are shown in the drawings and will herein be described in detail several specific embodiments with the understanding that the present disclosure is to be considered as an exemplification of the principles of the disclosure and is not intended to limit the disclosure to the embodiments illustrated. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and "comprising," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Some embodiments of the present invention can be deployed in a motor vehicle used for transportation, such as hybrid electric vehicles, plug-in hybrid electric vehicles, and all-electric vehicles. For example, FIG. 1 illustrates a partial structure of an electric car 100. Electric car 100 can be an automobile propelled by one or more electric motors 110. Electric motor 110 can be coupled to one or more wheels 120 through a drivetrain (not shown in FIG. 1). Electric car 100 can include frame 130 (also known as an underbody or chassis). Frame 130 can be a supporting structure of electric car 100 to which other components can be attached/mounted, such as, for example, battery pack 140a. Battery pack 140a can supply electricity to power one or more electric motors 110, for example, through an inverter. The inverter can change direct current (DC) from battery pack 140a to alternating current (AC), as can be required for electric motors 110, according to some embodiments.

As depicted in FIG. 1, battery pack 140a may be at least partially enclosed by frame 130 and disposed to provide a predefined separation (e.g., from structural rails 150 of an upper body that couples to frame 130). Accordingly, at least one of rear crumple zone 160, front crumple zone 170, and lateral crumple zone 180 can be formed around battery pack 140a. Both frame 130 and structural rails 150 may protect battery pack 140a from forces exerted from outside of electric car 100, such as, for example, in a collision.

Battery pack 140a may have a compact "footprint" such that it may be flexibly used in and disposed on frame 130 having different dimensions. Battery pack 140a can also be disposed in frame 130 to help improve directional stability (e.g., yaw acceleration). For example, battery pack 140a can be disposed in frame 130 such that a center of gravity of electric car 100 is in front of the center of the wheelbase (e.g., bounded by a plurality of wheels 120).

Figure 2A:
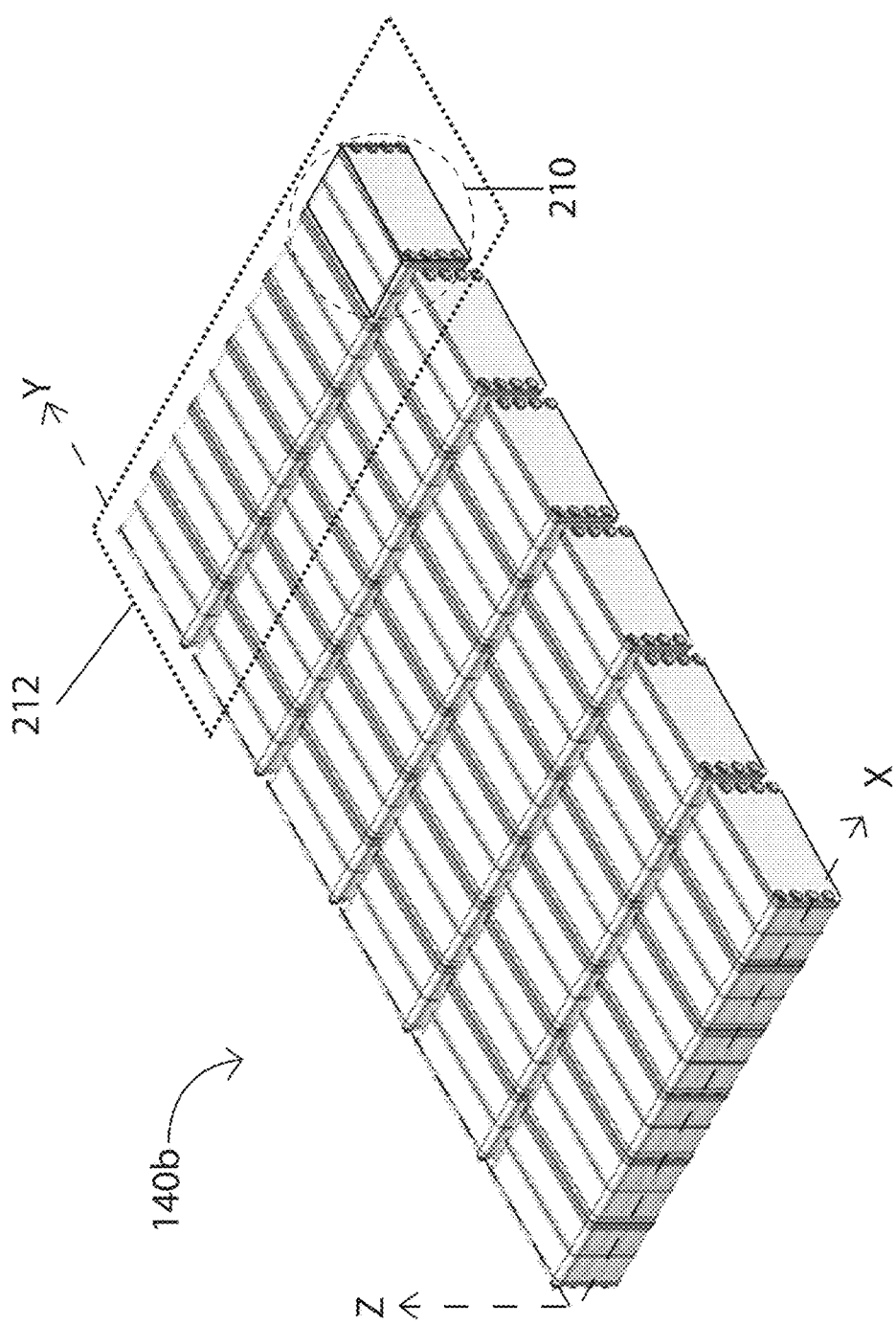
FIG. 2A shows an exemplary orientation of cells in an energy-storage system, according to various embodiments of the present disclosure.

FIG. 2A shows battery pack 140b with imaginary x-, y-, and z-axis superimposed, according to various embodiments. Battery pack 140b can include a plurality of battery modules 210. In a non-limiting example, battery pack 140b can be approximately 1000 mm wide (along x-axis), 1798 mm long (along y-axis), and 152 mm high (along z-axis), and can include thirty-six of battery modules 210.

Figure 2B:
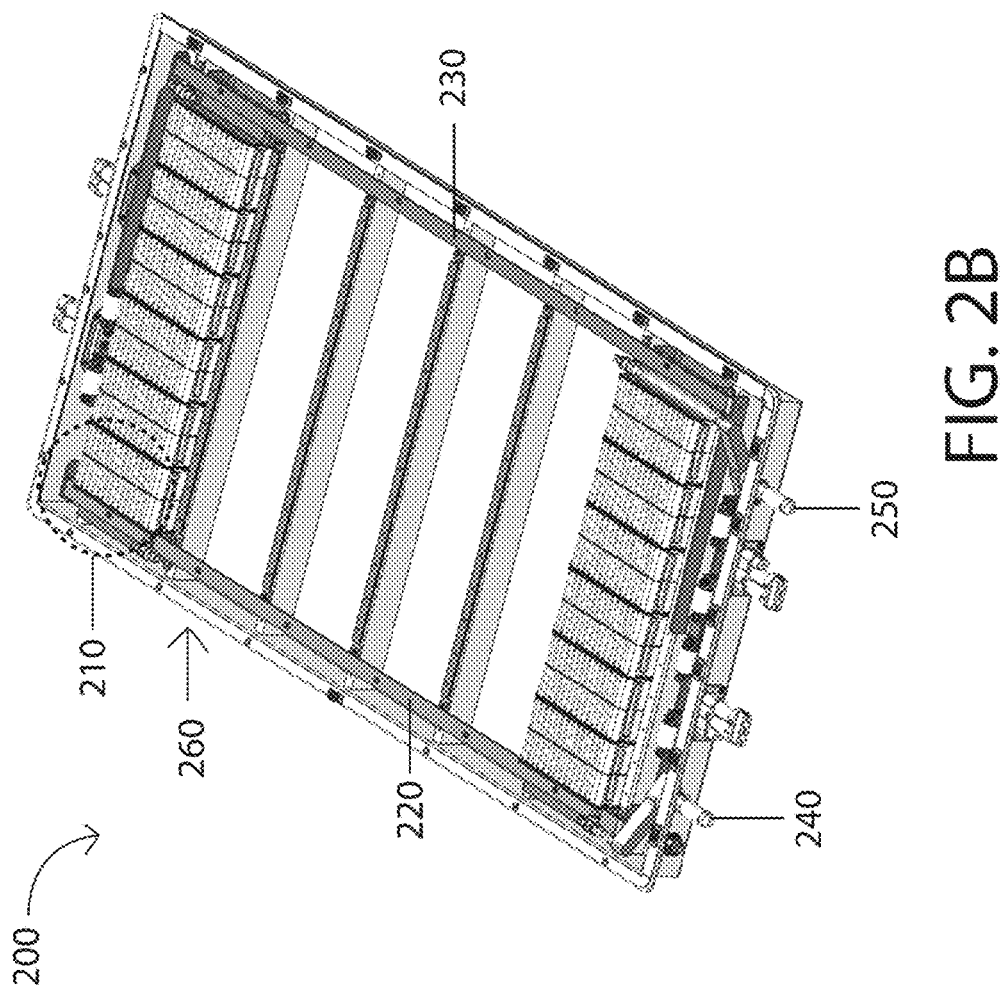
FIG. 2B depicts a bottom part of an enclosure of an exemplary battery pack such as shown in FIG. 2A.

FIG. 2B illustrates an exemplary enclosure 200 for battery pack 140b having a cover removed for illustrative purposes. Enclosure 200 can include tray 260 and a plurality of battery modules 210. Tray 260 may include positive bus bar 220 and negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 may be electrically coupled to a positive terminal 240 of enclosure 200. Negative bus bar 230 can be electrically coupled to a negative terminal 250 of enclosure 200. As described above with reference to FIG. 1, because bus bars 220 and 230 can be within structural rails 150, they can be protected from collision damage.

According to some embodiments, negative bus bar 230 and positive bus bar 220 can be disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140b) due to a deformity caused by an impact.

As will be described further in relation to FIG. 5, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140b (e.g., along the z-axis), in various embodiments.

The x-axis cell orientation of battery modules 210 in battery pack 140b shown in FIGS. 2A and 2B can be advantageous for efficient electrical and fluidic routing to each of battery module 210 in battery pack 140b. For example, at least some of battery modules 210 can be electrically connected in a series forming a string 212 and two or more of string 212 can be electrically connected in parallel. This way, in the event one of string 212 fails, others of string 212 may not be affected, according to various embodiments.

Figure 3:
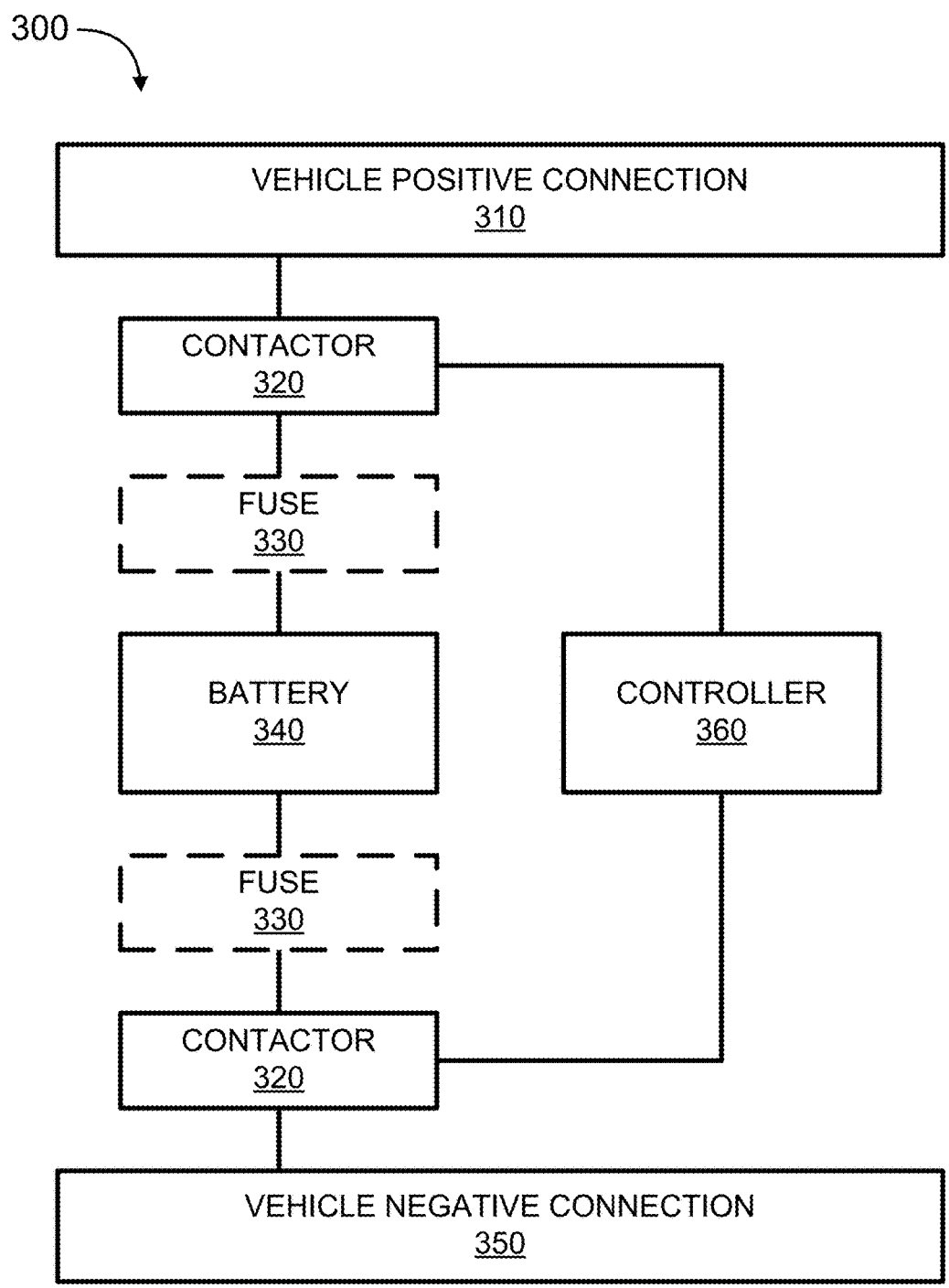
FIG. 3 is a simplified block diagram of a system, according to example embodiments.

FIG. 3 illustrates system 300 for selective electrical coupling and decoupling of an energy-storage system to electrical systems of electric car 100 (FIG. 1), according to some embodiments. For example, electrical systems may include at least one of: a drive train (e.g., inverter, motor, etc.), battery charging system, and the like. System 300 can include vehicle positive connection 310, contactors 320, optional fuses 330, battery 340, vehicle negative connection 350, and controller 360. Vehicle positive connection 310 and vehicle negative connection 350 can provide electrical coupling and decoupling of electrical systems of electric car 100 to battery 340. In some embodiments, vehicle positive connection 310 can be positive bus bar 220 (FIG. 2B) and vehicle negative connection 350 can be negative bus bar 230.

Controller 360 can be communicatively coupled to contactors 320 and control when contactors 320 are "open" (or "off") and "closed" (or "on"). In some embodiments, controller 360 can include or be a part of a vehicle management system. For example, the vehicle management system can control various electrical systems or functions of electric car 100, such as at least one of a drive train (e.g., inverter, motor, etc.), battery charging system, and the like. In some embodiments, controller 360 can include a microprocessor.

Battery 340 can be any configuration of electrical storage to be selectively coupled and decoupled to and from electrical systems of electric car 100. For example, battery 340 can be at least one of battery modules 210 (FIGS. 2A and 2B), battery pack 140a/140b, and the like. In some embodiments, battery 340 can be six of battery module 210 electrically coupled in series (e.g., string 212).

Contactors 320 can be electrically coupled to a respective fuse of optional fuses 330 and/or to battery 340. Contactors 320 can also be electrically coupled to a respective one of vehicle positive connection 310 and vehicle negative connection 350. Contactors 320 can be switches that selectively couple and decouple battery 340 to and from a respective one of vehicle positive connection 310 and vehicle negative connection 350. For example, using a control signal from controller 360, at least one of contactors 320 can be "open" (or "off") such that battery 340 is electrically decoupled from at least one of vehicle positive connection 310 and vehicle negative connection 350. Further using a (same or different) control signal from controller 360, at least one of contactors 320 can be "closed" (or "on") such that battery 340 is electrically coupled to at least one of vehicle positive connection 310 and vehicle negative connection 350. As shown in FIG. 3, there can be two contactors 320, one of contactor 320 each at vehicle positive connection 310 and vehicle negative connection 350. For example, if one of contactors 320 fails (e.g., is shorted) then the other one of contactors 320 can decouple battery 340 from vehicle positive connection 310 or vehicle negative connection 350. More or fewer of contactors 320 can be used.

Contactors 320 can be a switch. For example, contactors 320 can be a solid state switch. A solid state switch can be an electronic switching device that switches on or off when an (small) external voltage (e.g., control signal) is applied across its control terminal(s). Solid state switches can comprise at least one of a sensor which responds to an appropriate input (e.g., control signal), a solid state electronic switching device which switches power to a load circuitry, and a coupling mechanism to enable the control signal to activate this switch without mechanical parts. In some embodiments, contactors 320 can be at least one of a thyristor, silicon-/semiconductor-controlled rectifier (SCR), (power) metal-oxide semiconductor field-effect transistor (MOSFET), (high-current) triode for alternating current (TRIAC), insulated-gate bipolar transistor (IGBT), and the like. Solid state switches can offer the advantages of a smaller and slimmer profile (e.g., for tighter packing), faster switching time, longer service lifetimes, no sparking, and less susceptibility to environmental factors (e.g., mechanical shock, vibration, humidity, and external magnetic fields) than relays. Relays can be electrically operated switches and may use an electromagnet to mechanically switch open and closed.

In various embodiments, contactors 320 can also sense when current through contactors 320 exceeds a predetermined threshold. In response to the current through contactors 320 exceeding the predetermined limit, contactors 320 can switch "off" (e.g., very high resistance/impedance.).

Optional fuses 330 can be electrically coupled to battery 340 and a respective one of contactors 320. In some embodiments, optional fuses 330 can protect contactors 320 (e.g., solid state switches) from overcurrent. For example, a maximum input current for optional fuses 330 can be below a maximum (rated/predetermined) current for contactors 320 (e.g., solid state switches), such that at least one of optional fuses 330 will "blow" (e.g., interrupt/break electrical circuit/connection) before at least one of contactors 320 is damaged (e.g., shorted by bond wires fusing inside the solid state switch) by an overcurrent (e.g., current at or in excess of a maximum rated/predetermined current for the solid state switch). Optional fuses 330 can be a type of low resistance resistor that acts as a sacrificial device to provide overcurrent protection. Optional fuses 330 can include a metal wire or strip that melts when excess current flows through it, interrupting the circuit. For example, optional fuses 330 can be formed by etching a metal layer of a printed circuit board (PCB).

Figure 4:
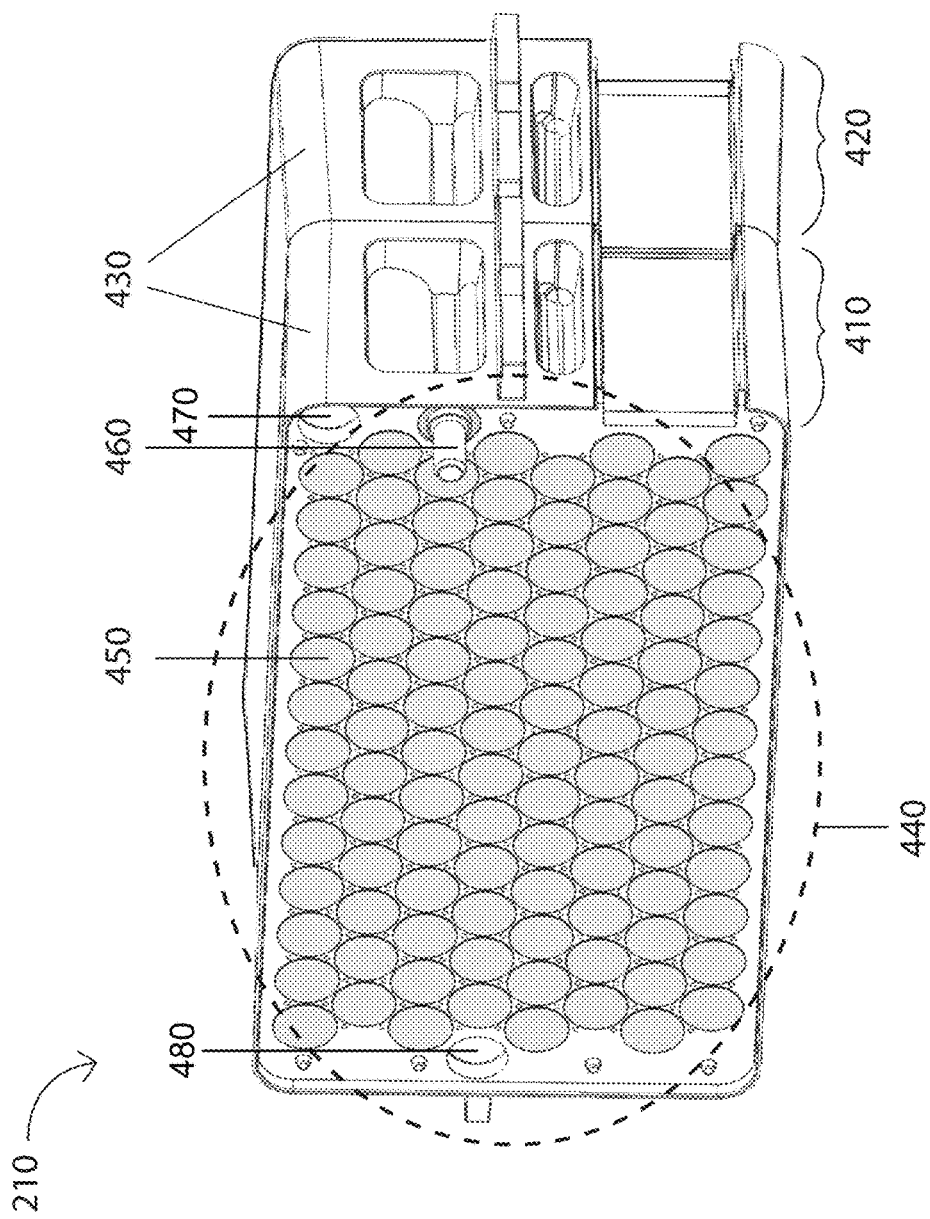
FIG. 4 is a simplified diagram of an exemplary battery module, according to various embodiments of the present disclosure.

FIG. 4 illustrates battery module 210 according to various embodiments. Main power connector 460 can provide power from battery cells 450 to outside of battery module 210. Coolant can be provided to battery module 210 at main coolant input port 480, receive/transfer heat from battery module 210, and be received at main coolant output port 470. In some embodiments, battery module 210 can include two half modules 410 and 420, each having enclosure 430. Enclosure 430 may be made using one or more plastics having sufficiently low thermal conductivities. Respective enclosures 430 of each of two half modules 410 and 420 can be coupled with each other to form a housing for battery module 210.

FIG. 4 includes view 440 of enclosure 430 (e.g., with a cover removed). For each of half modules 410, 420 there is shown a plurality of battery cells 450 oriented (mounted) horizontally (see also FIG. 5). By way of non-limiting example, each half module can include one hundred four of battery cells 450. By way of further non-limiting example, eight of battery cells 450 can be electrically connected in series (e.g., the staggered column of eight battery cells 450 shown in FIG. 4), with a total of thirteen of such groups of eight battery cells 450 electrically connected in series. By way of additional non-limiting example, the thirteen groups (e.g., staggered columns of eight battery cells 450 electrically coupled in series) can be electrically connected in parallel. This example configuration may be referred to as "8S13P" (8 series, 13 parallel). In some embodiments, the 8S13P electrical connectivity can be provided by current carrier 510, described further below in relation to FIGS. 5 and 6. Other combinations and permutations of battery cells 450 electrically coupled in series and/or parallel may be used.

Figure 5:
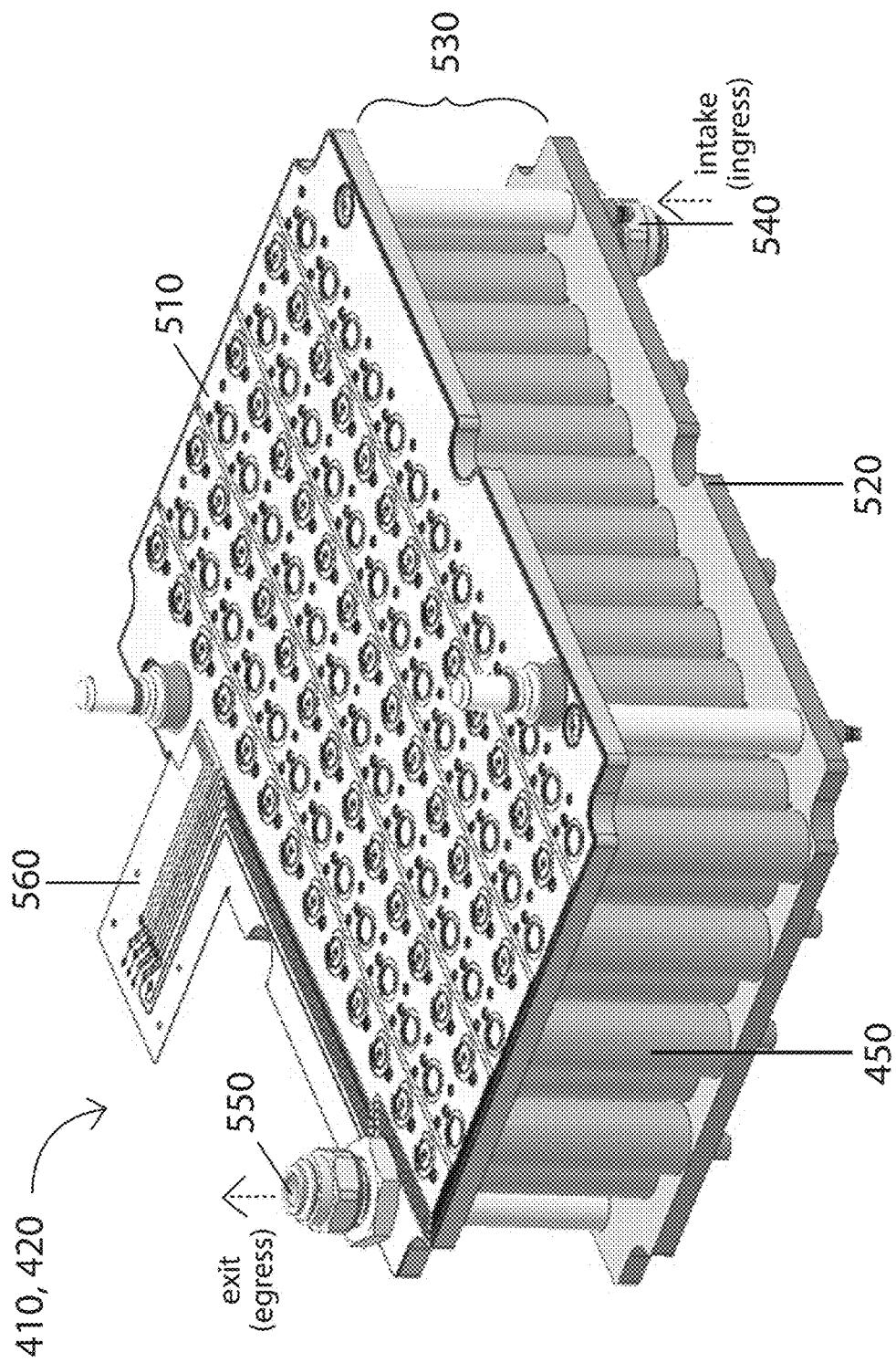
FIG. 5 illustrates an exemplary half module, in accordance with various embodiments.

FIG. 5 depicts a view of half modules 410 and 420 without enclosure 430, in accordance with various embodiments. Half modules 410 and 420 need not be the same, for example, they may be mirror images of each other in some embodiments. Half modules 410 and 420 can each include a plurality of battery cells 450. The plurality of battery cells 450 can be disposed between current carrier 510 and blast plate 520 such that an exterior side of each of battery cells 450 is not in contact with the exterior sides of other (e.g., adjacent) battery cells 450. In this way, coolant can circulate among and between battery cells 450 to provide submerged, evenly distributed cooling. In addition, to save the weight associated with coolant in areas where cooling is not needed, air pockets can be formed using channels craftily designed in space 530 between current carrier 510 and blast plate 520 not occupied by battery cells 450.

Coolant can enter half module 410, 420 through coolant intake 540, be optionally directed by one or more flow channels, circulate among and between the plurality of battery cells 450, and exit through coolant outtake 550. In some embodiments, coolant intake 540 and coolant outtake 550 can each be male or female fluid fittings. In some embodiments, coolant or cooling fluid can be at least one of: synthetic oil such as poly-alpha-olefin (or poly-α-olefin, abbreviated as PAO) oil, ethylene glycol and water, liquid dielectric cooling based on phase change, and the like. Compared to techniques using metal tubes to circulate coolant, submerged cooling can improve a packing density of battery cells 450 (e.g., inside battery module 210 and half modules 410, 420) by 15%, in various embodiments.

Figure 6A:
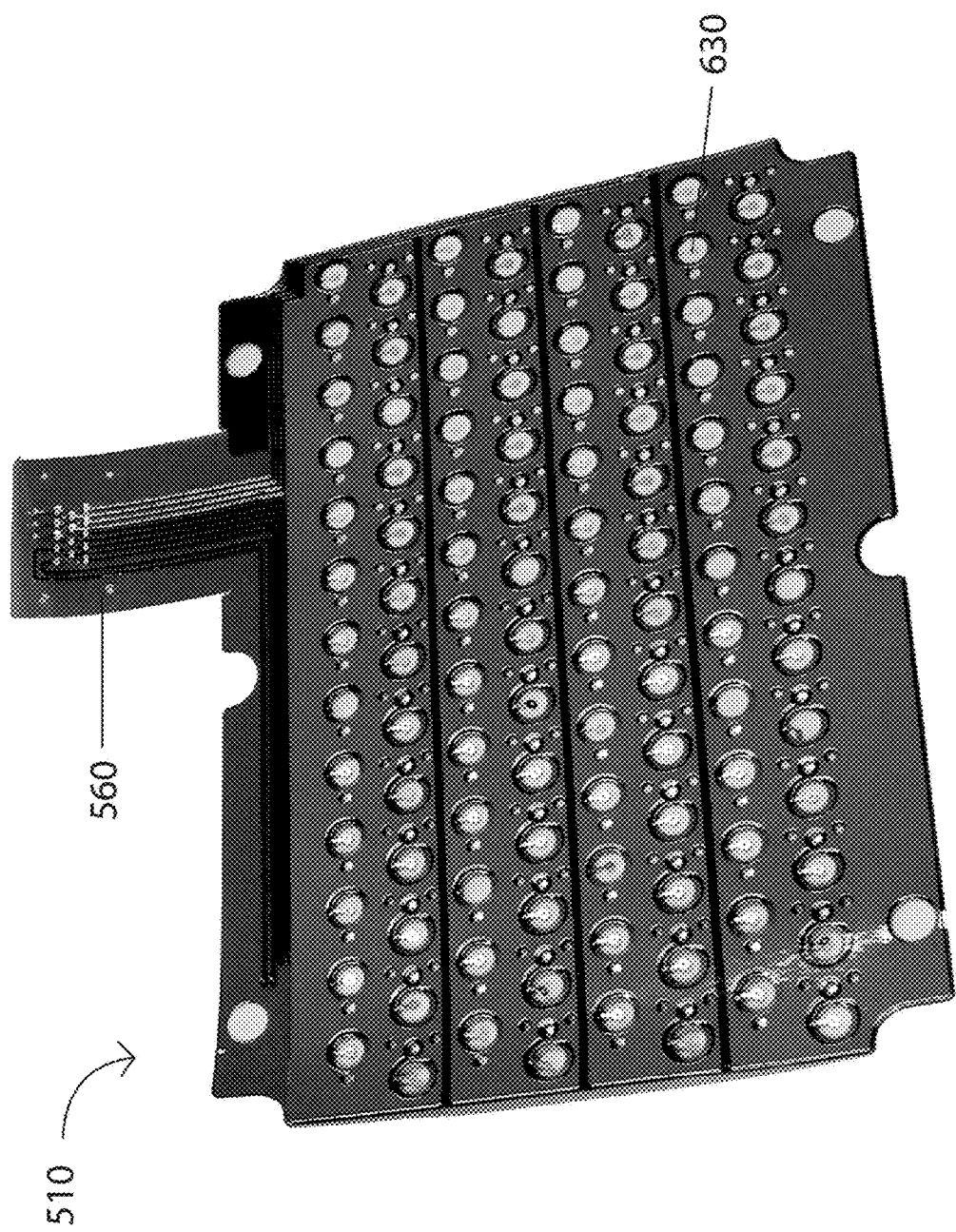
FIGS. 6A and 6B show an exemplary current carrier, according to various embodiments.
Figure 6B:
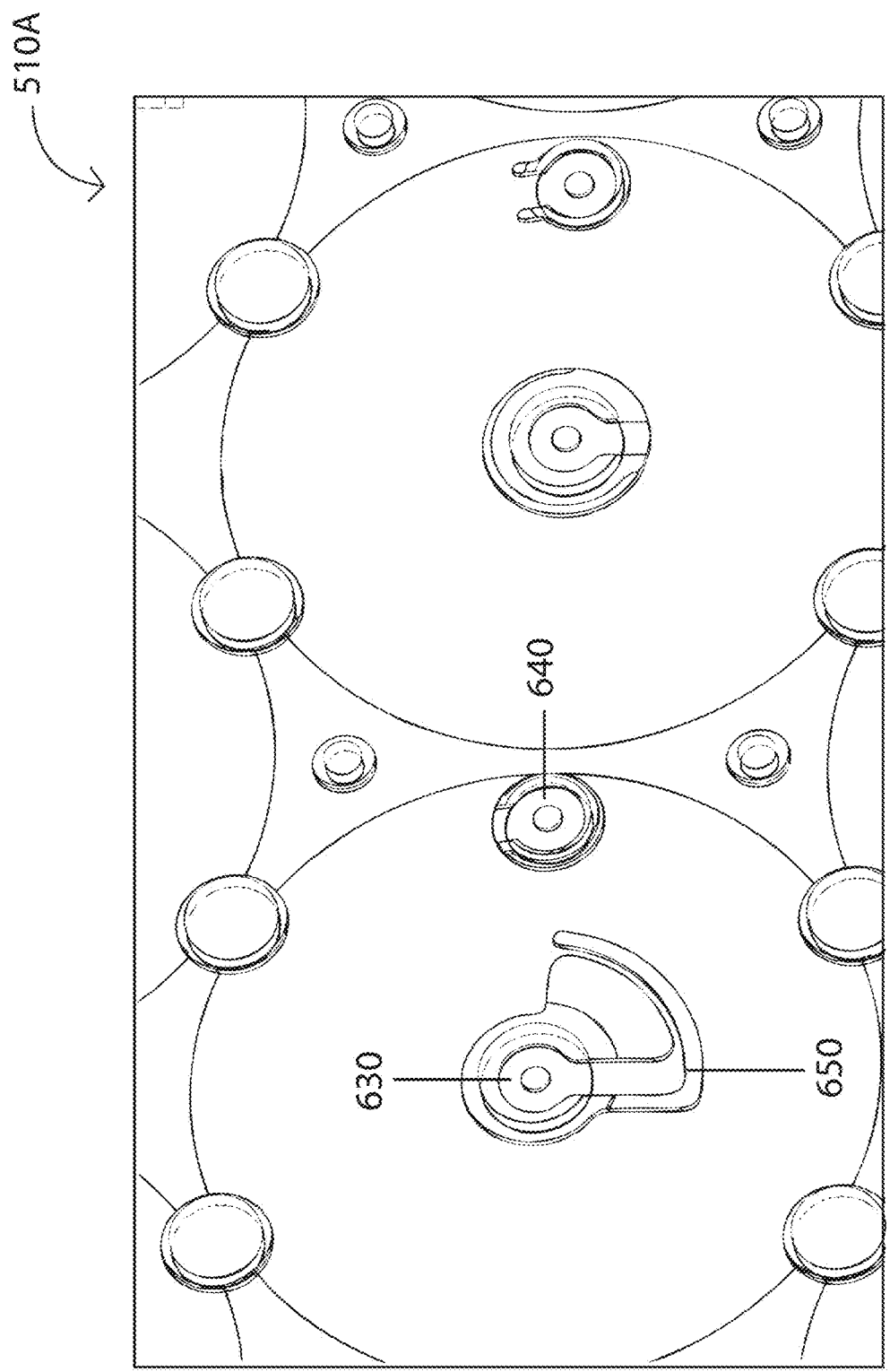

FIGS. 6A and 6B depict current carrier 510, 510A according to various embodiments. Current carrier 510, 510A can be generally flat (or planar) and can comprise one or more layers (not shown in FIGS. 6A and 6B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 510) to outside of battery module 210.

As depicted in FIG. 6B, current carrier 510A can be a magnified view of a portion of current carrier 510, for illustrative purposes. Current carrier 510A can be communicatively coupled to each of battery cells 450, for example, at separate (fused) positive (+) portion 630 and separate negative (−) portion 640 which can be electrically coupled to the positive power plane and negative power plane (respectively) of current carrier 510A, and to each cathode and anode (respectively) of battery cell 450. In some embodiments, positive (+) portion 630 can be laser welded to cathode terminal of battery cell 450, and negative (−) portion 640 can be laser welded to an anode terminal of battery cell 450. In some embodiments, the laser-welded connection can have on the order of 5 milli-Ohms resistance. In contrast, electrically coupling the elements using ultrasonic bonding of aluminum bond wires can have on the order of 10 milli-Ohms resistance. Laser welding advantageously can have lower resistance for greater power efficiency and can take less time to perform than ultrasonic wire bonding, which can contribute to greater performance and manufacturing efficiency.

Current carrier 510A can include fuse 650 formed from part of a metal layer (e.g., copper, aluminum, etc.) of current carrier 510A, such as in the positive power plane. In some embodiments, fuse 650 can be formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 450 (e.g., due to an internal short circuit), fuse 650 can "blow" breaking the electrical connection to battery cell 450 and electrically isolating battery cell 450 from current carrier 510A. Although an example of a fuse formed in the positive power plane was provided, a fuse may additionally or alternatively be a part of the negative power plane.

Additional thermal runaway control can be provided in various embodiments by scoring on end 740 (identified in FIG. 7) of battery cell 450. The scoring can promote rupturing to effect venting in the event of over pressure. In various embodiments, substantially all of battery cells 450 may be oriented to allow venting into blast plate 520 for both half modules 410 and 420 (FIG. 4).

In some embodiments, current carrier 510, 510A can be comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers, and copolymers.

In addition to electrically coupling battery cells 450 to each other (e.g., in series and/or parallel), current carrier 510 can provide electrical connectivity to outside of battery module 210, for example, through main power connector 460 (FIG. 4). Current carrier 510 may also include electrical interface 560 (FIGS. 5, 6A) which transports signals from the signal plane. Electrical interface 560 can include an electrical connector (not shown in FIGS. 5 and 6A).

Figure 7:
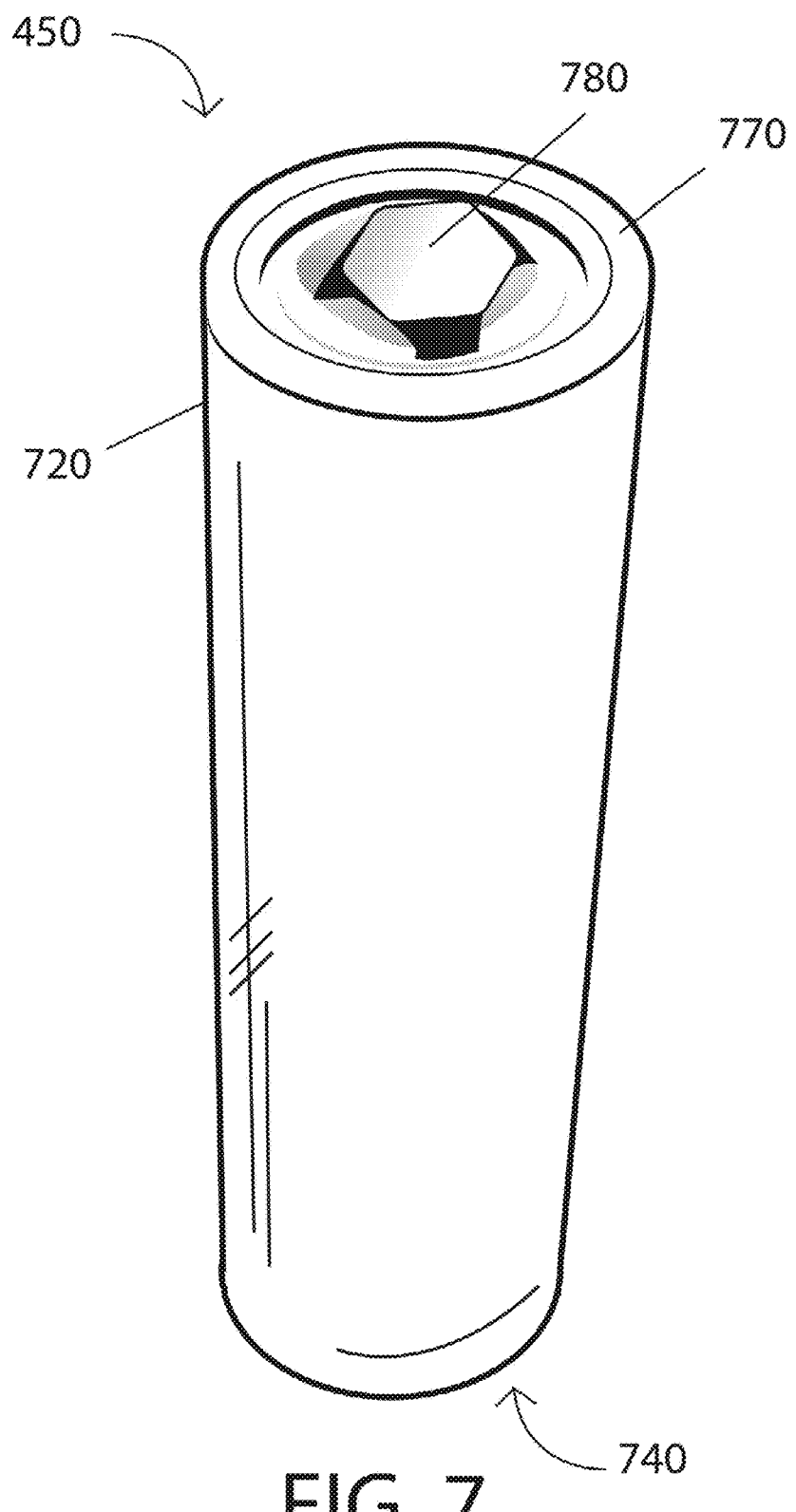
FIG. 7 depicts an example battery cell.

FIG. 7 shows battery cell 450 according to some embodiments. In some embodiments, battery cell 450 can be a lithium ion (li-ion) battery. For example, battery cell 450 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 450 can include can 720 (e.g., the cylindrical body), anode terminal 770, and cathode terminal 780. For example, anode terminal 770 can be a negative terminal of battery cell 450 and cathode terminal 780 can be a positive terminal of battery cell 450. Anode terminal 770 and cathode terminal 780 can be electrically isolated from each other by an insulator or dielectric.

As would be readily appreciated by one of ordinary skill in the art, various embodiments described herein may be used in additional applications, such as in energy-storage systems for wind and solar power generation. Other applications are also possible.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present disclosure and its practical application, and to enable others of ordinary skill in the art to understand the invention for various embodiments with various modifications as are suited to the particular use contemplated.

What is claimed is:

1. A battery coupling system comprising:
a first terminal electrically coupled to a vehicle electrical system;
a first contactor electrically coupled to a first battery connection of a battery and the first terminal, the first contactor comprising a first solid state switch for selectively coupling and decoupling the first battery connection to and from the first terminal, using a first control signal;
a second terminal electrically coupled to the vehicle electrical system;
a second contactor electrically coupled to a second battery connection of the battery and the second terminal, the second contactor comprising a second solid state switch for selectively coupling and decoupling the second battery connection to and from the second terminal, using a second control signal;
a first fuse electrically coupling the first contactor to the first battery connection, the first fuse configured to interrupt current flow between the first contactor and the first battery connection in response to the current flow exceeding a predetermined current lower than a rated current of the first contactor;
a second fuse electrically coupling the second contactor to the second battery connection, the second fuse configured to interrupt current flow between the first contactor and the first battery connection in response to the current flow exceeding a predetermined current lower than a rated current of the second contactor; and
an enclosure comprising a tray having the battery, the first contactor, and the second contactor disposed therein, the tray comprising a first bus bar electrically coupling the first contactor to the first terminal and a second bus bar electrically coupling the second contactor to the second terminal.

2. The system of claim 1 wherein:
the first battery connection has a first electrical polarity and the second battery connection has a second electrical polarity, the first electrical polarity being opposite of the second electrical polarity; and
the first terminal has a third electrical polarity and the second terminal has a fourth electrical polarity, the third electrical polarity being opposite of the fourth electrical polarity.

3. The system of claim 2 wherein the first solid state switch and the second solid state switch are each at least one of a: a thyristor, semiconductor-controlled rectifier (SCR), power metal-oxide semiconductor field-effect transistor (MOSFET), and triode for alternating current (TRIAC).

4. The system of claim 3 further comprising:
a controller providing the first and second control signals.

5. The system of claim 1 wherein the battery comprises:
a plurality of modules, each module comprising:
two half modules coupled together, each half module comprising:
a plurality of cylindrical rechargeable lithium-ion cells each having a first end and a second end, the first end distal from the second end, and having an anode terminal and a cathode terminal being disposed at the first end.

* * * * *